(12) United States Patent
Fukasawa

(10) Patent No.: US 6,241,152 B1
(45) Date of Patent: *Jun. 5, 2001

(54) CARD PROCESSING APPARATUS AND METHOD

(75) Inventor: Kazuo Fukasawa, Yokohama (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,077

(22) Filed: Sep. 8, 1998

(30) Foreign Application Priority Data

Nov. 14, 1997 (JP) .................................. 9-313708

(51) Int. Cl.$^7$ .................................................. G06K 7/08
(52) U.S. Cl. ............................................ 235/449; 235/493
(58) Field of Search .................................. 235/493, 450, 235/449, 380

(56) References Cited

U.S. PATENT DOCUMENTS

| | | | | |
|---|---|---|---|---|
| 3,566,356 | * | 2/1971 | Holm et al. ..................... | 340/149 |
| 3,986,205 | * | 10/1976 | Fayling ............................ | 360/2 |
| 4,023,204 | * | 5/1977 | Lee .................................. | 360/56 |
| 4,090,662 | * | 5/1978 | Fayling ............................ | 235/493 |
| 4,104,513 | * | 8/1978 | Pearce ............................ | 235/450 |
| 4,114,029 | * | 9/1978 | Lee .................................. | 235/449 |
| 4,132,350 | * | 1/1979 | Kubota et al. .................. | 235/493 |
| 4,149,669 | * | 4/1979 | Hermstein et al. ............. | 235/482 |
| 4,180,207 | * | 12/1979 | Lee .................................. | 235/493 |
| 4,197,989 | * | 4/1980 | Pearce ............................ | 235/493 |
| 4,507,550 | * | 3/1985 | Fleer .............................. | 235/493 |
| 4,609,812 | * | 9/1986 | Drexler .......................... | 235/487 |
| 4,612,436 | * | 9/1986 | Okada ............................ | 235/449 |
| 4,657,813 | * | 4/1987 | Asai et al. ..................... | 428/328 |
| 4,723,071 | * | 2/1988 | McGeary ........................ | 235/449 |
| 4,740,419 | * | 4/1988 | Asai et al. ..................... | 428/323 |
| 4,796,124 | * | 1/1989 | Yokota et al. .................. | 360/76 |
| 4,899,037 | * | 2/1990 | Marechal et al. .............. | 235/493 |
| 4,911,997 | * | 3/1990 | Asai et al. ..................... | 428/329 |
| 5,231,276 | * | 7/1993 | Yoshihara ..................... | 235/454 |
| 5,627,357 | * | 5/1997 | Cheng et al. .................. | 235/449 |
| 5,720,500 | * | 2/1998 | Okazaki et al. ............... | 283/82 |
| 5,883,377 | * | 3/1999 | Chapin, Jr. ..................... | 235/493 |
| 5,988,500 | * | 11/1999 | Litman ........................... | 235/450 |

FOREIGN PATENT DOCUMENTS

| | | | |
|---|---|---|---|
| 0080783 | * | 5/1983 | (JP) . |
| 0147194 | * | 6/1991 | (JP) . |
| 404003281 | * | 1/1992 | (JP) . |
| 406089376 | * | 3/1994 | (JP) . |

\* cited by examiner

*Primary Examiner*—Karl D. Frech
*Assistant Examiner*—Daniel St. Cyr
(74) *Attorney, Agent, or Firm*—Pillsbury Winthrop LLP

(57) ABSTRACT

A card processing apparatus process the card having the magnetic layer containing two types magnetic material. The one of the magnetic materials increases coercive force once receiving a magnetic field as compared to coercive force prior to application of the magnetic field and changes to a substantially irreversible state. This apparatus records first data by applying a magnetic field so as to record the data on the magnetic layer of the card at a first azimuth angle in order to change the states of the two types magnetic materials of the magnetic layer. This apparatus also records second data by applying a magnetic field so as to record the data at a second azimuth angle different from the first azimuth angle in order to change the state of the first magnetic material of the area of the card which is recorded as the first data. Further, this apparatus reads the first data recorded with the first azimuth angle and the second data recorded with the second azimuth angle, then determines that whether or not the first and second data is validly recorded on the card, and issues the card.

20 Claims, 8 Drawing Sheets

NORMAL RECORDING
(ISSUE INFORMATION RECORDING)
BY W1
AZIMUTH ANGLE OF 0°
(M + B MAGNETIC MATERIALS)

RECORDING BY W2 ON RESIDUAL
RECORDING (M MAGNETIC MATERIAL)
BY W1
AZIMUTH ANGLE OF 0°
(B MAGNETIC MATERIALS)

FIG. 10A — LOCAL PROCESSING OF REACTION OF M MAGNATIC MATERIAL BY HARD MAGNETIZATION

FIG. 10B — WRITE (MULTIPLEXED SIGNAL) (AT AZIMUTH ANGLE OF 0° IN THIS EMBODIMENT) TO M MAGNETIC MATERIAL BY W1

FIG. 10C — WRITE (ISSUE INFORMATION AND THE LIKE) (AT AZIMUTH ANGLE OF X° IN THIS EMBODIMENT) TO B MAGNETIC MATERIAL BY W2

CARD PROCESSING APPARATUS AND METHOD

BACKGROUND OF THE INVENTION

The present invention relates to a card processing apparatus and method for processing a magnetic card.

Generally, magnetic card processing machines for processing magnetic information of magnetic cards for use in, e.g., railway stations and distribution are required to be able to easily and stably process these cards. On the other hand, a magnetic card processing system having sufficient protecting ability is being desired to prevent a third party from easily reading, decoding, and altering recorded information.

Conventionally, therefore, magnetic card processing systems have been proposed which prevent a third party from easily reading, decoding, and altering recorded information by forming a multilayered recording magnetic layer by using materials having different magnetic characteristics. However, none of these systems have sufficient protecting ability because the characteristics of magnetic materials used are not largely different.

That is, in the conventionally proposed systems, a card is coated with, e.g., two layers made from a high-coercive force material (3,000 Oe: oersted) and a low-coercive force material (300 Oe), and different kinds of information are recorded in the high- and the low-coercive force layers, respectively. However, this coercive force difference is actually too small to stably record the independent pieces of information in the high- and the low-coercive force recording magnetic materials. Consequently, these kinds of information interfere with each other, or it is essentially possible to rewrite the information.

Accordingly, the conventional magnetic cards can be forged and altered.

BRIEF SUMMARY OF THE INVENTION

The present invention has been made in consideration of the above situation to eliminate the drawback of the conventional magnetic cards that these cards can be forged and altered, and has as its object to provide a card processing apparatus and method capable of preventing forgery and alteration of a magnetic card.

To achieve the above object, one aspect of the present invention provides a card processing apparatus for processing a card having a multilayered magnetic layer, comprising:

convey means for conveying the card having the multilayered magnetic layer containing a first magnetic material whose state reversibly (repeatedly) changes upon reception of a magnetic field and a second magnetic material which increases coercive force once receiving a magnetic field as compared to coercive force prior to application of the magnetic field and changes to a substantially irreversible state;

first magnetic recording means, arranged on the convey means, for recording first data by applying a magnetic field so as to record the data on the magnetic layer of the card at a first azimuth angle in order to change the states of the first and second magnetic materials of the magnetic layer;

second magnetic recording means, arranged on the convey means downstream from the first magnetic recording means along a conveyance direction of the card, for recording second data by applying a magnetic field so as to record the data at a second azimuth angle different from the first azimuth angle in order to change the state of the first magnetic material of the magnetic layer of the card which is recorded with the first magnetic recording means;

verify means, arranged on the convey means downstream from the second magnetic recording means along the conveyance direction of the card, for reading the first data recorded on the card at the first azimuth angle by the first magnetic recording means and the second data recorded on the card at the second azimuth angle by the second magnetic recording means; and determination means for determining on the basis of the data read by the verify means whether the first and second data recorded by the first and second magnetic recording means are valid.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments below, serve to explain the principles of the invention.

FIGS. 10A to 10D are views showing examples of recorded states to explain the detailed case of the card processing apparatus according to the present invention.

DETAILED DESCRIPTION OF THE INVENTION

Figure 1:
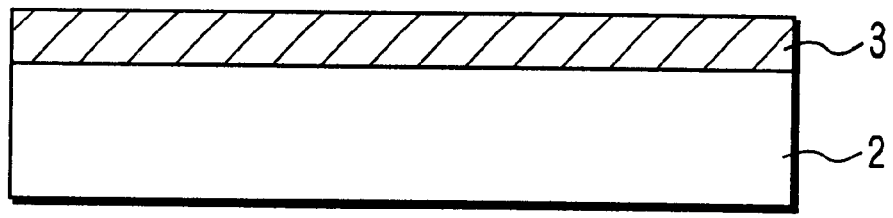
FIG. 1 is a schematic sectional view showing the arrangement of a magnetic card to explain an outline of a card processing apparatus according to the present invention.

Reference will now be made in detail to presently preferred embodiments of the invention as illustrated in the accompanying drawings, in which like reference characters designate like or corresponding parts throughout the several drawings.

Preferred embodiments of the present invention will be described below with reference to the accompanying drawings.

First, an outline of a magnetic card processing apparatus and method to which the present invention is applied will be described.

Figure 2:
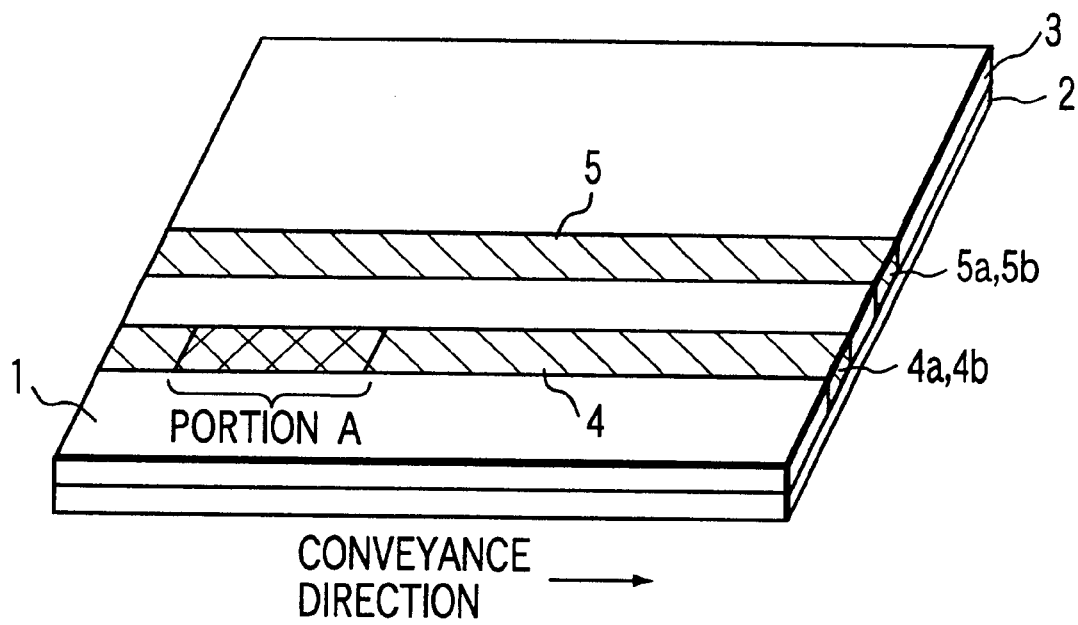
FIG. 2 is a perspective view for explaining the track arrangement of the magnetic card to explain the outline of the card processing apparatus according to the present invention.

FIGS. 1 and 2 show a magnetic card coated with a magnetic material, such as a pass, a ticket, or a prepaid card for use in, e.g., means of transportation or distribution.

The present invention will be described by taking a prepaid card as a magnetic card having a stored-value function for a fixed face value as an example.

That is, as shown in FIG. 1, a magnetic card 1 is obtained by forming a magnetic layer 3 as a mixture of a high-coercive force recording magnetic material and another magnetic material on a substrate layer 2.

This substrate layer 2 is made of PET (PolyEthyleneTerephthalate) or paper.

The magnetic layer 3 is formed by coating the substrate layer 2 with a magnetic material mixture of a high-coercive force recording magnetic material mainly made of barium ferrite and having coercive force of about 3,000 Oe and an M magnetic material (e.g., a manganese bismuth <MnBi> magnetic powder which greatly changes its initial coercive force after exposed to a magnetic field). This M magnetic material has characteristics (data rewrite with a conventional magnetic head is difficult) which initially have as low coercive force as the high-coercive force recording magnetic material set by a special treatment prior to magnetic field application and greatly increase the coercive force once exposed to a magnetic field as compared to the coercive force prior to the magnetic field application or that of the high-coercive force recording magnetic material.

As shown in FIG. 2, the magnetic layer 3 of the magnetic card has two tracks, i.e., an issue information track 4 and a use record track 5.

Issue information is recorded on the issue information track 4 with a magnetic head at the time of issue, i.e., in the initial state.

Consequently, an M magnetic material 4a records the issue information with very high coercive force.

A high-coercive force recording magnetic material 4b records the recorded contents with high coercive force and can rewrite the recorded contents.

In reading the card, data recorded in the two magnetic materials 4a and 4b can be read out.

Once the issue information track 4 is exposed to a magnetic field, the M magnetic material 4a greatly increases its coercive force to disable rerecording in this M magnetic material 4a.

The issue information track 4 is suitable for recording information (not to be rewritten once recorded at the time of issue), such as basic issue information of the magnetic card 1, which is recorded only at the time of issue and cannot be rewritten and also records protective information such as an encryption key.

That is, since data in this issue information track 4 cannot be rewritten, recording difficult to alter can be performed.

The above issue information is information containing information indicating the face value, the issued institution name, and the range of applicable systems (e.g., a company name or transportation institution name), and the issue number as a card ID.

The information such as the issued institution name and the issue number which can help find forgery is simultaneously (collectively) recorded in a portion A (the last half of the issue information track 4 of the magnetic card 1) shown in FIG. 2.

With this information which can help find forgery, information relating to attacks can be extracted from a forged card.

That is, when a forged card is an illicitly copied card, the information such as the issue institution name and the issue number recorded in the original magnetic card 1 can be found from the reproduced information obtained by reproducing the corresponding portion.

In this case, since the information which can help find the forged card is recorded in the M magnetic material 4a of the original magnetic card 1 whose data cannot be rewritten, this information cannot be erased even with a DC magnetic field (to be described later).

The above information can be erased from the forged card by the DC magnetic field. This facilitates to determine the card as the forged card.

This portion, in which the information which can help find the forged card is simultaneously (collectively) recorded, can be any arbitrary portion or an entire portion.

The use record track 5 is erased by a DC magnetic field (application of a magnetic field) at the time of issue, i.e., in the initial state. Consequently, an M magnetic material 5a greatly increases its coercive force as compared with the high-coercive force recording magnetic material 5b to disable magnetic rewriting.

The data in the high-coercive force recording magnetic material 5b is erased (application of a magnetic field) by a DC magnetic field at the time of issue, i.e., in the initial state. Information recorded with high coercive force is erased, and no information is recorded.

High-coercive force recording is performed for the use record track 5 at a current value having the same level as the erasure level using the DC magnetic field. For this reason, the M magnetic material 5a is not influenced by recording because the coercive force of the M magnetic material 5a has changed to very high coercive force, while the high-coercive force recording magnetic material 5b can record or rewrite data as in the conventional case.

The use record track 5 is therefore used as a recording area in which the use record and updating of the balance (accounting information) are recorded each time the card is used (a transaction such as settlement of a purchase).

That is, as information generated each time the card is used, information such as a used amount and a purchased object, use record information such as the date and place of use, and the balance information after the purchase (use) are repeatedly read and recorded every time the card is used.

As described above, the magnetic cards 1 having the same magnetic material structure are set for different purposes in units of tracks by the initial processing. This also prevents alteration.

Figure 3:
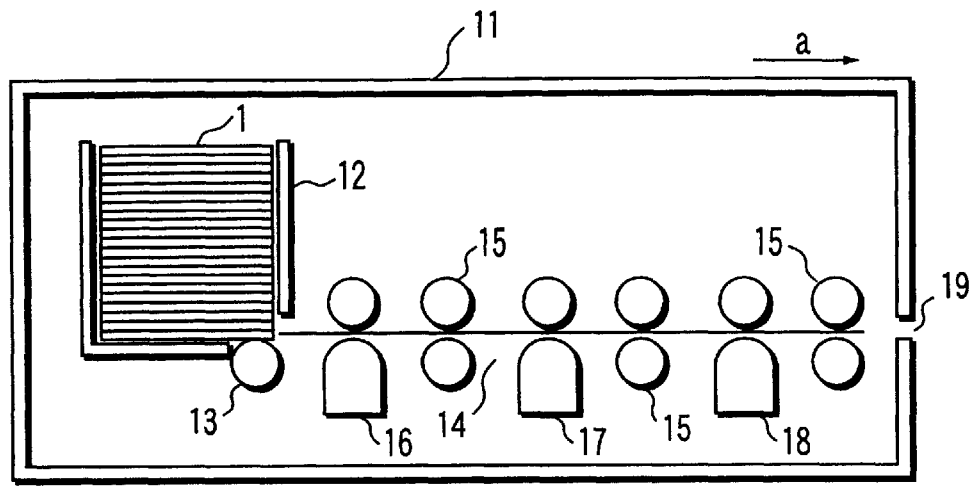
FIG. 3 is a sectional view showing the main parts of a magnetic card issuing machine to explain the outline of the card processing apparatus according to the present invention.

FIG. 3 is a sectional view showing the major components of a magnetic card issuing machine.

Referring to FIG. 3, a stacker 12 containing a plurality of magnetic cards before issue is placed on the left-hand side in a main body 11.

The magnetic cards 1 stacked in the stacker 12 are picked up one by one by a pickup roller 13 and conveyed along a conveyance path 14.

Along this conveyance path 14, conveyor rollers 15 for conveying the magnetic card 1 are arranged to convey the magnetic card 1.

Also, write heads 16 and 17 and a read head 18 are disposed in this order along the conveyance path 14. The write heads 16 and 17 record information on the magnetic card 1 picked up by the pickup roller 13 and erase information by a DC magnetic field. The read head 18 reads out information recorded on the magnetic card 1.

The magnetic card 1 read by the read head 18 is issued from an issue port 19 formed at the end of the conveyance path 14.

The magnetic card 1 is conveyed along the conveyance path 14 in as conveyance direction a shown in FIG. 3.

The write heads 16 and 17 have a plurality of recording elements along a direction perpendicular to the conveyance direction of the magnetic card 1 and can independently apply a recording or erasing magnetic field to the issue information track 4 and the use record track 5.

The read head 18 also has a plurality of recording elements and can independently read the issue information track 4 and the use record track 5.

Figure 4:
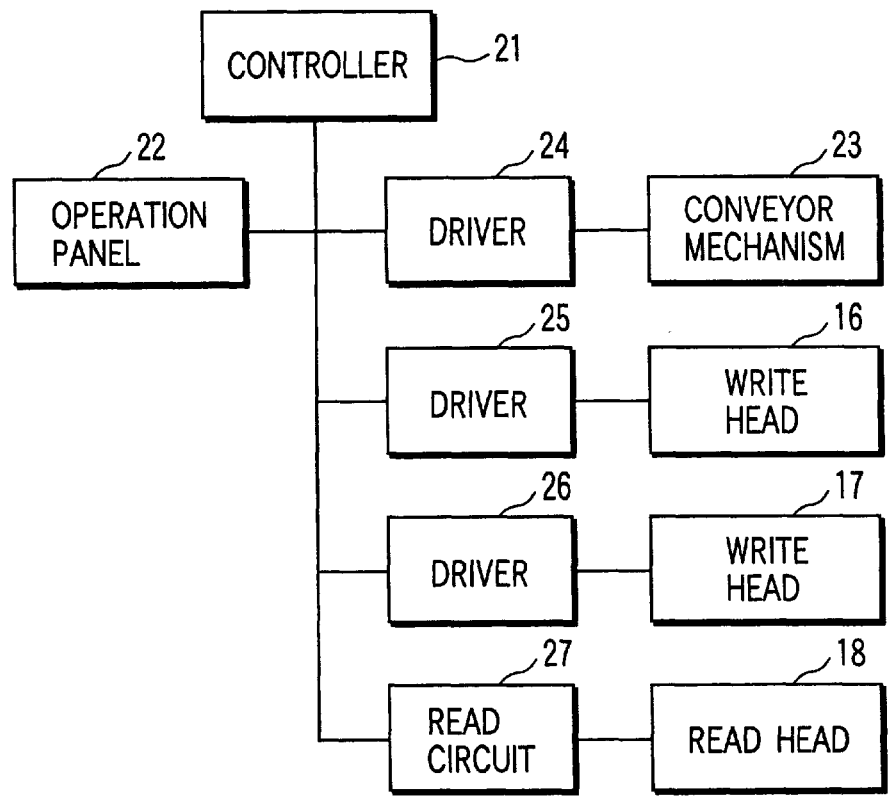
FIG. 4 is a block diagram showing the configuration of a control circuit of the magnetic card issuing machine to explain the outline of the card processing apparatus according to the present invention.

FIG. 4 is a block diagram showing the configuration of a control circuit of the magnetic card issuing machine.

Referring to FIG. 4, a controller 21 controls the whole magnetic card issuing machine and has a memory for storing data in it.

This controller 21 is connected to an operation panel 22 for inputting the contents of issue including the face value information and the like, a driver 24 for driving a conveyor mechanism 23 including the pickup roller 13 and the conveyor rollers 15, a driver 25 for driving the write head 16, a driver 26 for driving the write head 17, and a read circuit 27 for checking the contents read by the read head 18.

The drivers 25 and 26 drive the write heads 16 and 17 at almost the same current value.

Figure 5:
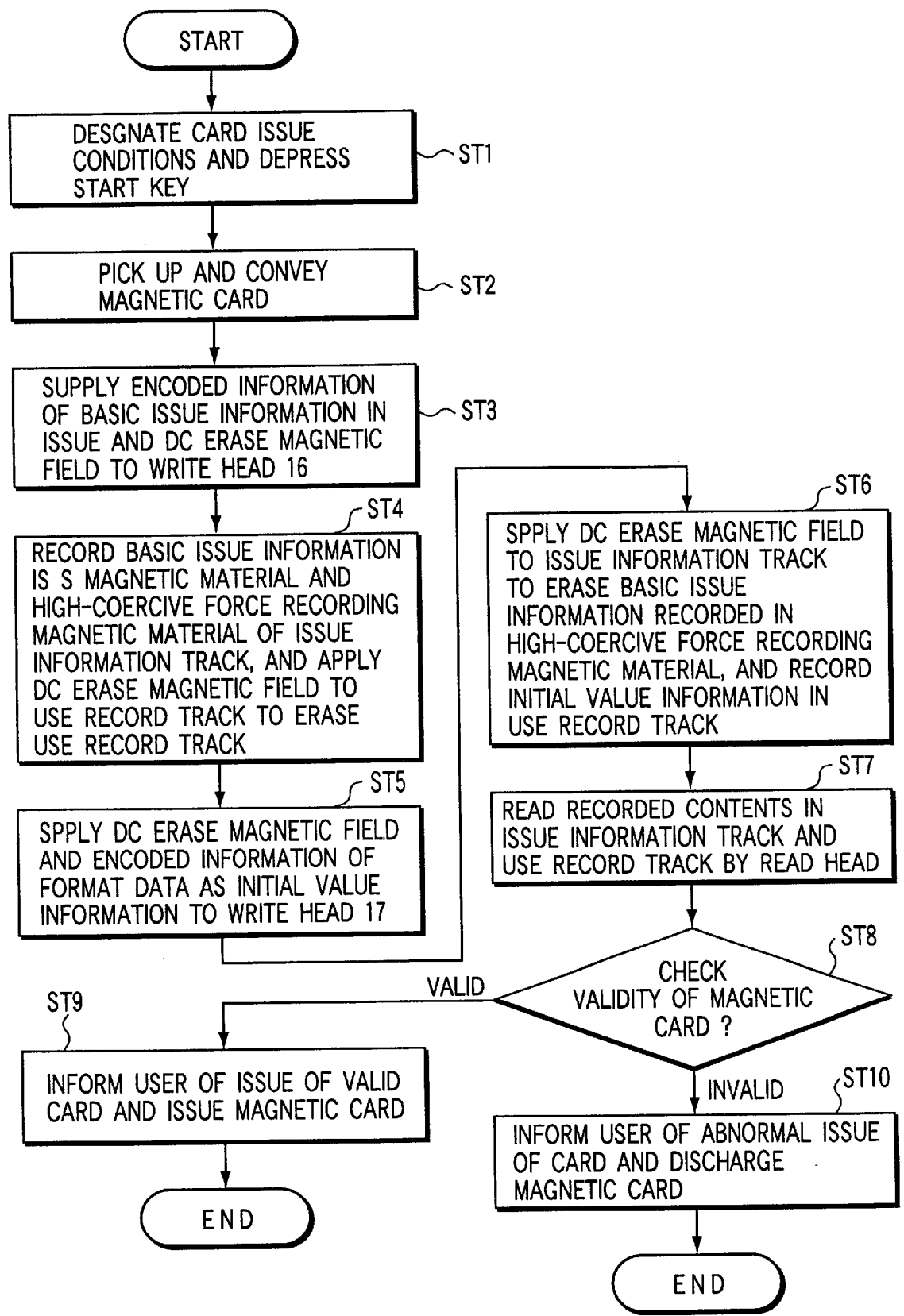
FIG. 5 is a flow chart for explaining a process of issuing a magnetic card to explain the outline of the card processing apparatus according to the present invention.

A process of issuing the magnetic card 1 by using the magnetic card issuing machine as described above will be described below with reference to a flow chart in FIG. 5.

First, the card issue conditions, e.g., the face value, the issued institution name, the range of applicable systems, and the issue number are designated by the operation panel 22, and a start key is depressed (step ST1).

The controller 21 then controls the driver 24 to drive the conveyor mechanism 23, thereby rotating the pickup roller 13 and the conveyor rollers 15.

Consequently, a magnetic card 1 stacked in the stacker 12 is picked up by the pickup roller 13 and conveyed along the conveyance path 14 (step ST2).

As issue information corresponding to the card issue conditions designated by the operation panel 22, the controller 21 supplies, to the write head 16 through the driver 25, information indicating the face value, the issued institution name, and the range of applicable systems, encoded information indicating the issue number as a card ID, and a DC erase signal which does not record information (step ST3).

The write head 16 records this issue information, i.e., the information indicating the face value, the issued institution name, and the range of applicable systems, and the issue number as a card ID in the M magnetic material 4a and the high-coercive force recording magnetic material 4b of the issue information track 4.

A DC erase magnetic field is applied to the use record track 5 to erase data from the entire track 5 (step ST4).

Consequently, the issue information is recorded in the M magnetic material 4a of the issue information track 4 with much higher coercive force than that of the high-coercive force recording magnetic material 4b.

Data in the M magnetic material 5a of the use record track 5 is erased with much higher coercive force than that of the high-coercive recording magnetic material 5b.

The unique information such as the issued institution name and the issue number which can help find forgery is simultaneously (collectively) recorded in the portion A (the last half of the issue information track 4 of the magnetic card 1) shown in FIG. 2.

The controller 21 stores the issue information described above in an internal memory.

The controller 21 then supplies a DC erase signal and encoded information of format data as initial value information to the write head 17 through the driver 26 (step ST5).

Accordingly, the write head 17 applies a DC erase magnetic field to the issue information track 4 to erase the issue information recorded in the high-coercive force recording magnetic material 4b.

A magnetic field based on the initial value information, e.g., the format data is applied to the use record track 5 to change the high-coercive, force recording magnetic material 5b to record data while the M magnetic material 5a does not change (step ST6).

Consequently, the basic issue information is recorded with much higher coercive force in the M magnetic material 4a of the issue information track 4 than in the high-coercive force recording magnetic material 4b, and data in the high-coercive force recording magnetic material 4b of the track 4 is erased.

The M magnetic material 5a of the use record track 5 is erased with very high coercive force as compared with the high-coercive recording magnetic material 5b, and the format data is recorded in the high-coercive force recording magnetic material 5b of the track 5.

Additionally, the read head 18 reads the issue information track 4 and the use record track 5 and supplies the readout contents to the controller 21 through the read circuit 27 (step ST7).

The controller 21 compares the readout contents from the issue information track 4 with the basic issue information used upon recording and stored in the internal memory.

The controller 21 checks on the basis of the readout contents from the use record track 5 whether the format data is correctly recorded, thereby checking the validity of the magnetic card 1 (step ST8).

If the magnetic card 1 is found to be valid, the controller 21 informs the user of the issue of a valid card by the operation panel 22 and issues the magnetic card 1 from the issue port 19 (step ST9).

If the magnetic card 1 is not found to be valid in step ST8, the controller 21 informs the user of the abnormal issue of a card and discharges the magnetic card 1 from the issue port 19 (step ST10).

Alternatively, a collecting box may be arranged in the apparatus, and the magnetic card 1 thus abnormally issued may be collected in the collecting box.

In this issue process, the read output of the information recorded in (the M magnetic material 4a of) the issue information track 4 is on the same level as the read output of the information recorded in (the high-coercive force recording magnetic material 5b) of the use record track 5.

This can be possible by forming the magnetic layer 3 at a component ratio at which the output conditions of the high-coercive force recording magnetic materials and the M magnetic materials in these tracks are the same.

The principal parts of the present invention based on the above outline will be described below.

That is, the present invention relates to the arrangement and processing of magnetic cards, such as the magnetic card 1 shown in FIGS. 1 and 2, formed in the formation apparatus for magnetic cards by using an M magnetic material as described above which initially has low coercive force set by a special treatment and greatly increases the coercive force (makes recording by conventional magnetic heads difficult) once exposed to a magnetic field as compared with the high-coercive force recording magnetic material (to be referred to as a B magnetic material hereinafter). The features of the present invention are as follows.

(1) The gist of the present invention is to provide a card processing apparatus (reader/writer) and a card processing method using a magnetic card coated with the combination of a conventional high-coercive force magnetic material (barium ferrite) and an M magnetic material. A magnetic recording processing method of this magnetic card is so changed as to identify the card and record and process encryption key information by using different signal processing methods different in azimuth angle.

The combinations of coating of this magnetic card are (a) coating of two layers (coating of separate layers made of the B magnetic material serving as the high-coercive force recording magnetic material and the M magnetic material), and (b) coating of a mixture of two materials, i.e., the B and M magnetic materials in one layer.

The combinations of the azimuth angle and the recording magnetic material are (a) recording of a normal reproduction signal in the M magnetic material at an azimuth angle of 0° and recording of a multiplexed signal in the B magnetic material at an azimuth angle of X° (0<X<90°), and (b) recording of a normal reproduction signal in the B magnetic material at an azimuth angle of 0° and recording of a multiplexed signal in the M magnetic material at an azimuth angle of X° (0<X<90°).

(2) Another gist of the present invention is to provide a card processing apparatus (reader/writer) for performing multiplexed information recording using the differences in azimuth angles as the composite condition such that local hard magnetization processing (data erase processing) is performed for a track using a hard magnetization feature by processing for terminating the magnetic reaction of the M magnetic material as described in issue information recording in the M magnetic material, i.e., using the fact that information once recorded does not change, and unique data is recorded in the remaining portion of the track, or data is recorded at an azimuth angle of X° in a direction not perpendicular to the conveyance direction of the card.

(3) Still another gist of the present. invention is to provide a card processing apparatus (reader/ writer) serving as a card issuing machine and a card processing apparatus serving as a card processing machine for processing a card issued by the card issuing machine, the card issuing machine performing multiplexed information recording using the differences in azimuth angles as the composite condition such that local hard magnetization processing (data erase processing) is performed for a track using a hard magnetization feature by processing for terminating the magnetic reaction of the M magnetic material as described in issue information recording in the M magnetic material, i.e., using the fact that information once recorded does not change, and unique data is recorded in the remaining portion of the track, or data is recorded at an azimuth angle of X° in a direction not perpendicular to the conveyance direction of the card.

(4) Still another gist of the present invention to provide a card processing apparatus (reader/writer) for performing local hard magnetization processing for the track, recording the use record by widening the hard magnetized portion for each use, and disabling use for reproduction.

In this case, a hard magnetization processing method may be magnetic erase processing or mechanical destruction such as punching.

Embodiments according to the present invention will be described below.

First Embodiment

Figure 6:
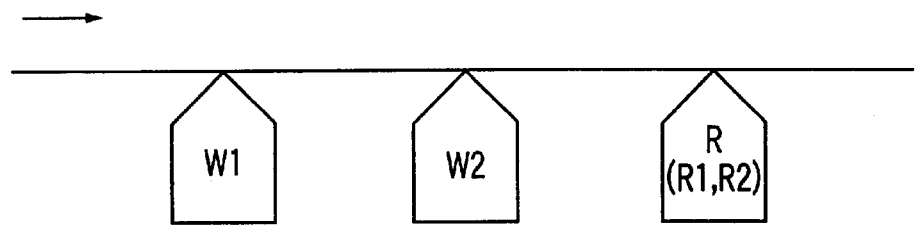
FIG. 6 is a view for explaining the detailed case of the card processing apparatus according to the present invention.

A magnetic recording conveyor system having an arrangement as shown in FIG. 6 records a multiplexed signal on a magnetic recording medium, such as the magnetic card 1 shown in FIGS. 1 and 2, having a magnetic material structure which includes two layers of a high-coercive force recording magnetic material (B magnetic material) and an M magnetic material or contains a mixture of the two materials in one layer.

In the magnetic recording conveyor system as shown in FIG. 6, a first write magnetic head W1, a second write magnetic head W2, and a duplex azimuth reproducing magnetic head R are arranged in the order shown in FIG. 6.

The write magnetic heads W1 and W2 and the reproducing magnetic head R have the following characteristic features.

the write magnetic head W1: an azimuth angle of 0° (the direction of a magnetic gap perpendicular to the card conveyance direction, i.e., the direction perpendicular to the flow of the magnetic current is the same direction)

the write magnetic head W2: an azimuth angle of X° (X has a finite value larger than 0° and less than 90°)

the duplex azimuth reproducing magnetic head R: a dual magnetic head capable of reading at two data of azimuth angles of 0° and X° (it is also possible to use a first reproducing magnetic head R1 capable of reading at an azimuth angle of 0° and a second reproducing magnetic head R2 capable of reading at an azimuth angle of X°)

This magnetic recording conveyor system conveys a magnetic recording medium toward the write magnetic head W1 in a direction indicated by the arrow.

The write magnetic head W1 writes data in the magnetic recording medium on the basis of a normal recording signal (recording of issue information described above).

The data is recorded in both the M and B magnetic materials of the magnetic recording medium.

Next, the write magnetic head W2 records a multiplexed signal at an azimuth angle of X° in the magnetic recording medium.

Since the M magnetic material is completely recorded by the write magnetic head M1 and the magnetic reaction in this material is complete, only the B magnetic material changes, and the data is recorded.

Figure 7A:
FIGS. 7A and 7B are views for explaining the detailed case of the Card processing according to the present invention.
Figure 7B:

This recording process is as shown in FIGS. 7A and 7B.

That is, as shown in FIG. 7A, the write magnetic head W1 records (issue information) at an azimuth angle of 0° in the (M+B magnetic materials). After that, as shown in FIG. 7B, the write magnetic head W2 records at an azimuth angle of X° (B magnetic material) on the residual recording (M magnetic material) done. by the write magnetic head W1.

The characteristic feature of this recording process is that the signal recorded at an azimuth angle of 0° in the M magnetic material is multiplexed with the signal recorded at an azimuth angle of X° in the B magnetic material.

These signals can be easily separated during reproduction in accordance with, e.g., the mechanism of the reproducing magnetic head R.

Figure 8A:
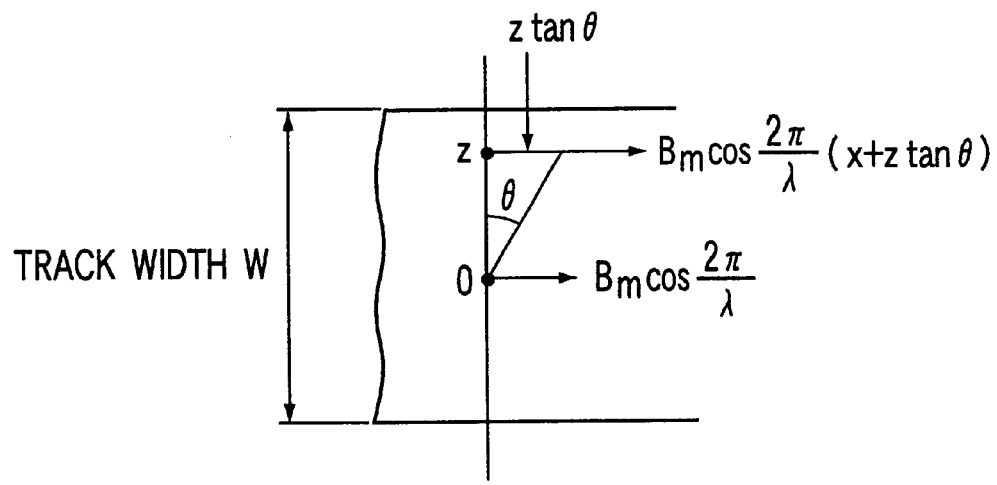
FIGS. 8A and 8B are views for explaining the detailed case of the card processing apparatus according to the present invention.
Figure 8B:
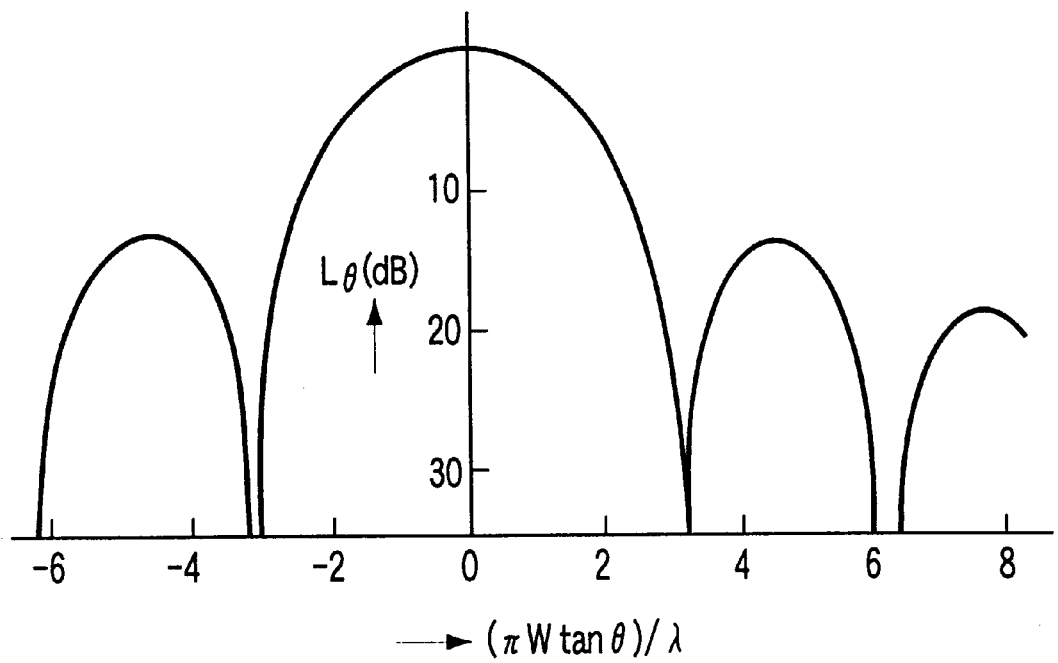

As shown in an azimuth loss graph of FIG. 8B, the azimuth angle difference between the recorded signal and the reproducing magnetic head has a large effect on the reproduction output characteristic.

Accordingly, the azimuth angle difference is strictly managed because reproduction conditions are impaired in the presence of a slight azimuth angle difference.

However this is the case, the M magnetic material signal and the B magnetic material signal have different azimuth angles. Therefore, the reproducing magnetic head R corresponding to these azimuth angles can reproduce the two magnetic signals independently of each other because the interference output between the two is very small as shown in FIG. 8B.

This allows easy recording of a multiplexed signal on a single magnetic track.

In the resultant magnetic recorded state, the signals recorded at different azimuth angles are multiplexed even if the recording track is physically coated with a fine magnetic powder. Hence, this recorded state is difficult to see by means of visually checking a magnetized portion. This makes the recorded state strong against decoding.

As described above, it is possible to provide a method capable of easily recording a multiplexed signal and easily reproducing the signal without any complicated signal processing.

The azimuth loss characteristic shown in FIG. 8A is described by:

$$\text{loss } L = \sin\{(\pi W \tan\theta)/\lambda\}/\{(\pi W \tan\theta)/\lambda\}$$

This relation is generally represented in units of dB as $$\text{azimuth loss} = -20\log_{10}(\text{loss } L) \text{ dB}$$

Figure 9:
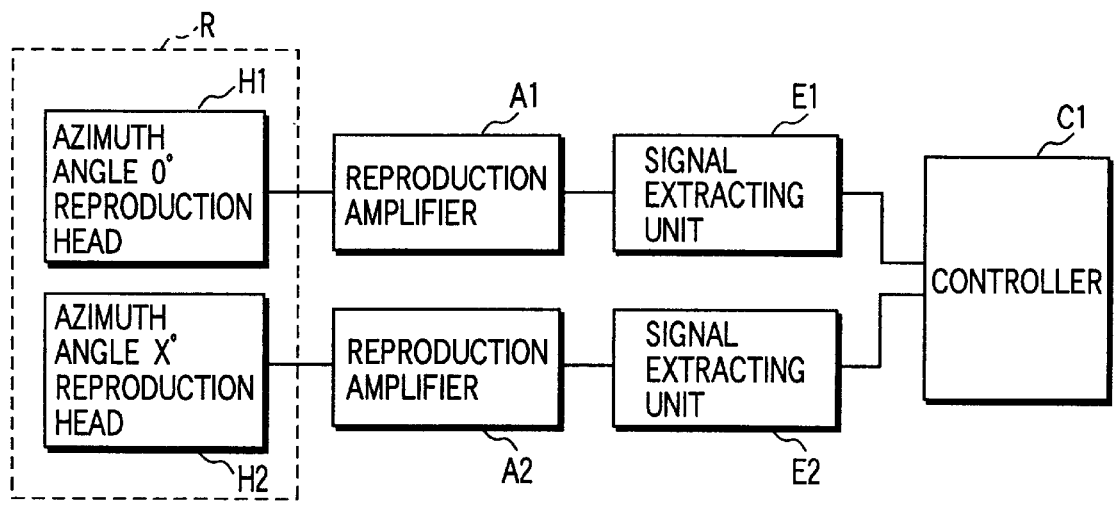
FIG. 9 is a block diagram showing the configuration of a reproducing system to explain the detailed case of the card processing apparatus according to the present invention.

FIG. 9 shows the arrangement of a reproducing system according to this method.

In this arrangement, a reproducing magnetic head H1 with an azimuth angle of 0° and a reproducing magnetic head H2 (or a duplex azimuth reproducing magnetic head R) with an azimuth angle of X° are connected to a controller C1 through reproducing amplifiers A1 and A2 and signal extracting units E1 and E2, respectively.

Note that the above combinations of the azimuth angles of write magnetic heads W1 and W2 can be reversed.

These two means are possible because importance is sometimes primarily given to a method by which signals to be reproduced (normal reproduction, recording, . . . , issue information signals) cannot be rewritten against forgery and sometimes primarily given to a method by which signals are erased from the forged card and thereby protected from misuse.

When processing of the present invention is to be added to the existing system as a new function, the azimuth angle of issue information signals is desirably 0°. However, when a new system is to be constructed, either method can be used.

When importance is primarily given to the method by which issue information signals cannot be rewritten, the following operation is performed:

the write magnetic head W1 records issue information and the like at an azimuth angle of 0°, and the write magnetic head W2 records a security information at an azimuth angle of X°.

When importance is primarily given to the method by which signals to be reproduced are erased upon misuse, the following operation is performed:

the write magnetic head W1 records a security information at an azimuth angle of X°, and the write magnetic head W2 records issue information and the like at an azimuth angle of 0°.

When the above combinations are switched in accordance with signals, the operations are as follows.

When importance is primarily given to the method by which signals to be reproduced cannot be rewritten, the following operation is performed:

the write magnetic head Wi records issue information and the like at an azimuth angle of X°, and the write magnetic head W2 records a security information at an azimuth angle of 0°.

When importance is primarily given to the method by which signals to be reproduced are erased upon attacking, the following operation is performed:

the write magnetic head WI records a security information at an azimuth angle of 0°, and the write magnetic head W2 records issue information and the like at an azimuth angle of X°.

According to the first embodiment, therefore, there can be provided a card processing apparatus (reader/writer) and method, in which a magnetic card coated with a mixture of the B magnetic material such as a high-coercive force recording magnetic material (barium ferrite) and the M magnetic material, and the magnetic recording processing method for the magnetic card is changed to record card identification information and encrypted information by different signal processing methods for different azimuth angles.

Second Embodiment

A process of completing a magnetic reaction of an M magnetic material is called hard magnetization (see the aforementioned explanation of one-time recording). When the write magnetic heads W1 and W2 described above write after this hard magnetization process, as shown in FIG. 10A, a local recording process can be done by the write magnetic head W1 by using a hard magnetization pattern.

Consequently, as shown in FIGS. 10B and 10C, multiplexed information can be further added.

Figure 10D:
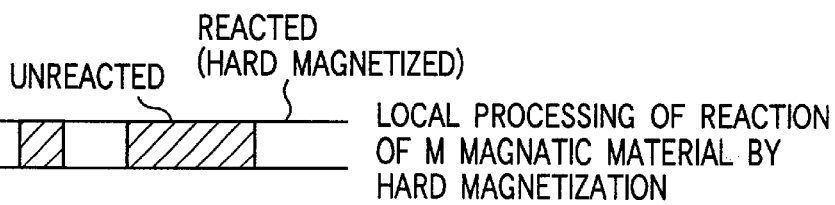
Figure 10D:
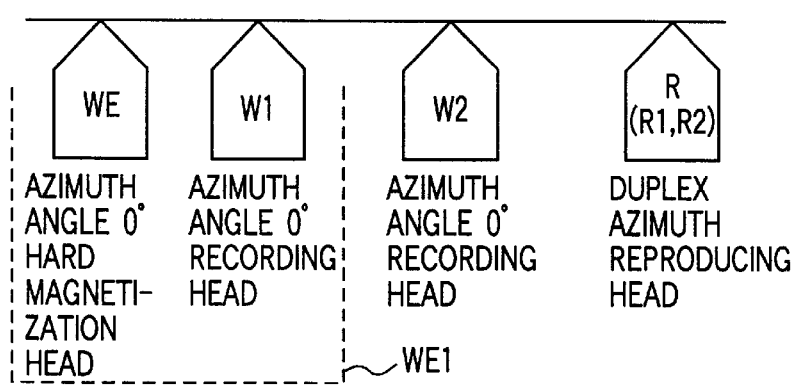

FIG. 10D shows the arrangement of a magnetic recording/reproducing conveyor system used in this embodiment.

First, as shown in FIG. 10A, a write magnetic head WE shown in FIG. 10D applies a magnetic field to part of a track or a plurality of areas of the magnetic recording medium which is conveyed to an arrow direction and causes an M magnetic material to locally react by hard magnetization (data erase processing and rewrite disable processing) to produce unreacted portions and reacted portions.

Next, as shown in FIG. 10B, a write magnetic head W1 shown in FIG. 10D writes data (multiplexed signal) (at an azimuth angle of 0° in this embodiment) on the unreacted portions (FIG. 10A) of the M magnetic material.

As shown in FIG. 10C, a write magnetic head W2 shown in FIG. 10D writes data (e.g., issue information at an azimuth angle of X° in this embodiment) on a B magnetic material. Then, a duplex azimuth reproducing head R (or separate azimuth reproducing heads R1 and R2) shown in FIG. 10D reproduces the information.

Referring to FIG. 10D, the write magnetic head WE and the write magnetic head W1 are separate heads. In this case, the azimuth of the recording data on the M magnetic material can be changed with respect to the azimuth of the local hard magnetized portion of the M magnetic material of the track.

The write magnetic head WE and the write magnetic head W1 can also be integrated into one magnetic head structure (WE1).

If this is the case, the azimuths of hard magnetization processing and recording data are equal to each other.

In this case, hard magnetization by the write magnetic head WE and recording by the write magnetic head W1 can be synchronized. Therefore, the mutual signal relationship can be further given a meaning.

According to the second embodiment, there can therefore be provided a card processing apparatus (reader/writer) for performing multiplexed information recording using the differences in azimuth angles as the composite condition such that local hard magnetization processing (data erase processing) is performed for a track using a hard magnetization feature by processing for terminating the magnetic reaction of the M magnetic material as described in issue information recording in the M magnetic material, i.e., using the fact that information once recorded does not change, and unique data is recorded in the remaining portion of the track, or data is recorded at an azimuth angle of X° in a direction not perpendicular to the conveyance direction of the card.

Third Embodiment

The third embodiment provides a card processing apparatus (reader/writer) serving as a card issuing machine and a card processing apparatus serving as a card processing machine for processing a card issued by the card issuing machine, the card issuing machine performing multiplexed information recording using the differences in azimuth angles as the composite condition such that local hard magnetization processing (data erase processing) is performed for a track using a hard magnetization feature by processing for terminating the magnetic reaction of the M magnetic material as described in issue information recording in the M magnetic material, i.e., using the fact that information once recorded does not change, and unique data is recorded in the remaining portion of the track, or data is recorded at an azimuth angle of X° in a direction not perpendicular to the conveyance direction of the card. This fourth embodiment will be described below with reference to FIGS. 11A to 11G.

Figure 11A:
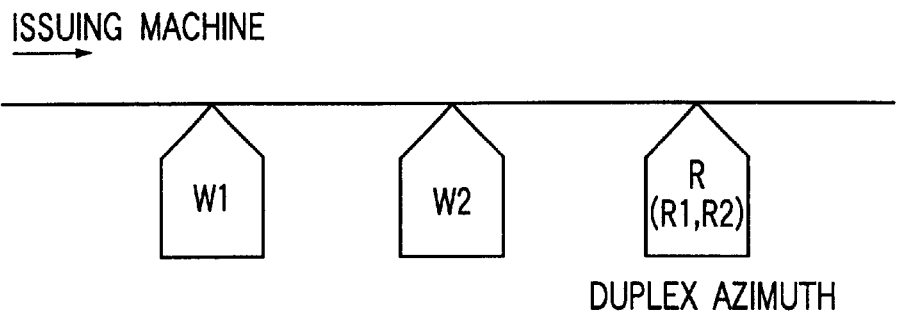
FIGS. 11A to 11G are views showing other examples of recorded states to explain the detailed case of the card processing apparatus according to the present invention.

In the card issuing machine as shown in FIG. 11A, a write magnetic head W1, a write magnetic head W2, and a reproducing magnetic head R are arranged in the order shown in FIG. 11A as a magnetic recording conveyor system.

The write magnetic heads W1 and W2 and the reproducing magnetic head R have the following characteristic features:

the write magnetic head WI: an azimuth angle of 0° (the direction of a magnetic gap perpendicular to the card conveyance direction, i.e., the direction perpendicular to the flow of the magnetic current is the same direction)

the write magnetic head W2: an azimuth angle of X° (X has a finite value larger than 0° and less than 90°)

the reproducing magnetic head R: a duplex azimuth reproducing magnetic head as a dual magnetic head capable of reading at two azimuth angles of 0° and X° (note that the first reproducing magnetic head R1 capable of reading data at an azimuth angle of 0° and the second reproducing magnetic head R2 capable of reading data at an azimuth angle of X° may be used.)

This magnetic recording conveyor system conveys a magnetic recording medium toward the write magnetic head W1 in a direction indicated by the arrow.

The write magnetic head W1 writes a normal reproduction signal (conventional issue information) in the magnetic recording medium.

This signal is recorded in both the M magnetic material and a B magnetic material of the magnetic recording medium.

Next, the write magnetic head W2 records a multiplexed signal at an azimuth angle of X° in the magnetic recording medium.

Since the M magnetic material is completely recorded by the write magnetic head M1 and the magnetic reaction in this material is complete, only the B magnetic material is changed, and data is recorded.

Figure 11B:
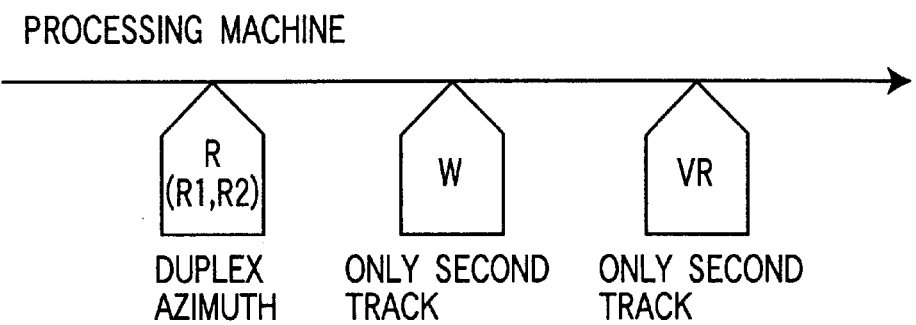
Figure 11C:
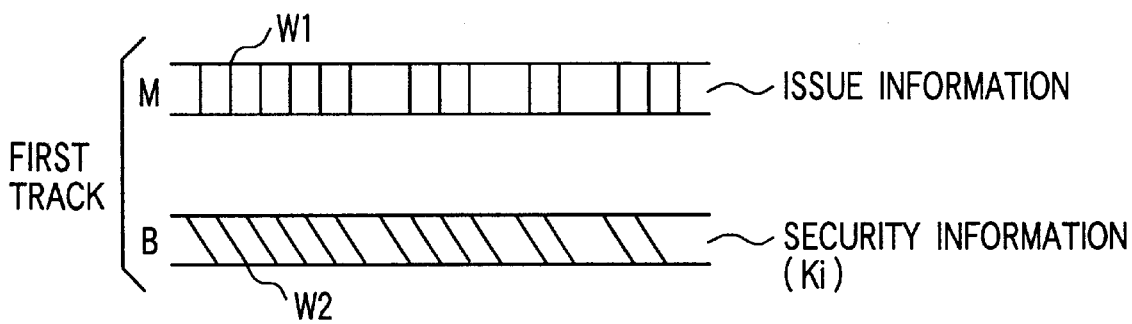

This recording process is as shown in FIG. 11C.

That is, as shown in the upper half of FIG. 11C, the write magnetic head W1 records (issue information) at an azimuth angle of 0° in the M magnetic material (although the recording process is actually performed for the M and B magnetic materials, the M magnetic material is considered separately form the B magnetic material shown in the lower half of FIG. 11C to simplify the explanation) of a first track 4 of a magnetic card 1 as shown in FIGS. 1 and 2. Thereafter, as shown in the lower half of FIG. 11C, the write magnetic head W2 records (security information Ki) at an azimuth angle of X° (B magnetic material) on the residual recording (M magnetic material) done by the write magnetic head W1.

The characteristic feature of this recorded state is that the signal recorded at an azimuth angle of 0° in the M magnetic material is multiplexed with the signal recorded at an azimuth angle of X° in the B magnetic material.

Figure 11D:
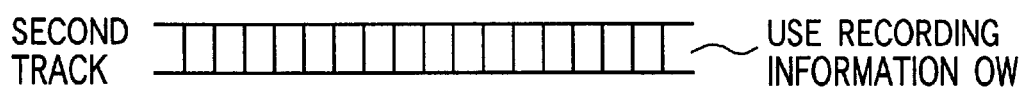

At the same time, a hard magnetization process is performed for a second track 5 of the magnetic card 1 as shown in FIGS. 1 and 2. Thereafter, use record information is overwritten as shown in FIG. 11D.

As described previously, the process of completing a magnetic reaction of the M magnetic material is called hard magnetization (see the aforementioned explanation of issue information recording). This hard magnetization process is first performed for the second track 5 of the magnetic card 1, and then the write magnetic heads W1 and W2 write. Consequently, (use record information) can be recorded by the write magnetic head W1 by using a hard magnetization pattern.

In this case, since the use record information represents the first time, i.e., zero, the issue information itself is used as initial use record information $m_O$.

Figure 11E:
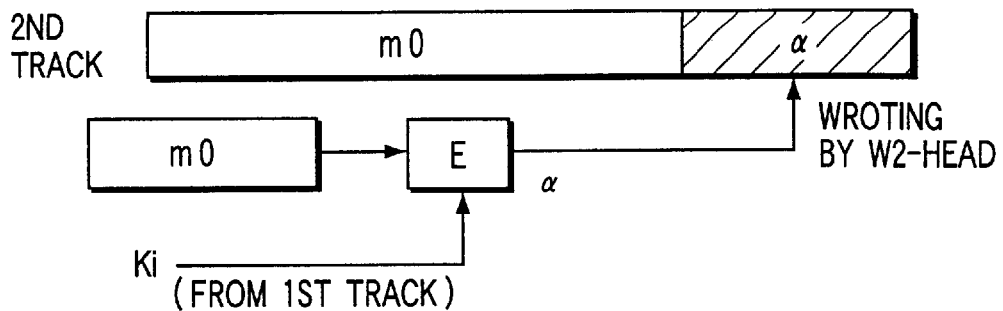

As shown in FIG. 11E, using the initial use record information $m_O$, the security information Ki from the first track 4 of the magnetic card 1 is encoded to produce encoded information α. At the same time, the write magnetic head W2 writes the encoded information α (encoded information α recording) in the second track 5 of the magnetic card 1.

The duplex azimuth reproducing magnetic head R then reproduces the first and second tracks 4 and 5 of the magnetic card 1 recorded as described above to check on the basis of the reproduction signals whether the card is to be issued.

In the processing machine, as shown in FIG. 11B, a duplex azimuth reproducing magnetic head R, a write magnetic head W, and a verify magnetic head VR are arranged in the order shown in FIG. 11B as a magnetic recording conveyor system.

Note that the write magnetic head W and the verify magnetic head VR operate for only the second track 5 of the magnetic card 1.

This magnetic recording conveyor system conveys a magnetic recording medium from the duplex azimuth reproducing magnetic head R in a direction indicated by the arrow.

First, the duplex azimuth reproducing magnetic head R reproduces issue information and security information as shown in FIG. 11C from the first track 4 of the magnetic card 1 as shown in FIGS. 1 and 2 and the use record information $m_O$ from the second track 5.

Figure 11F:
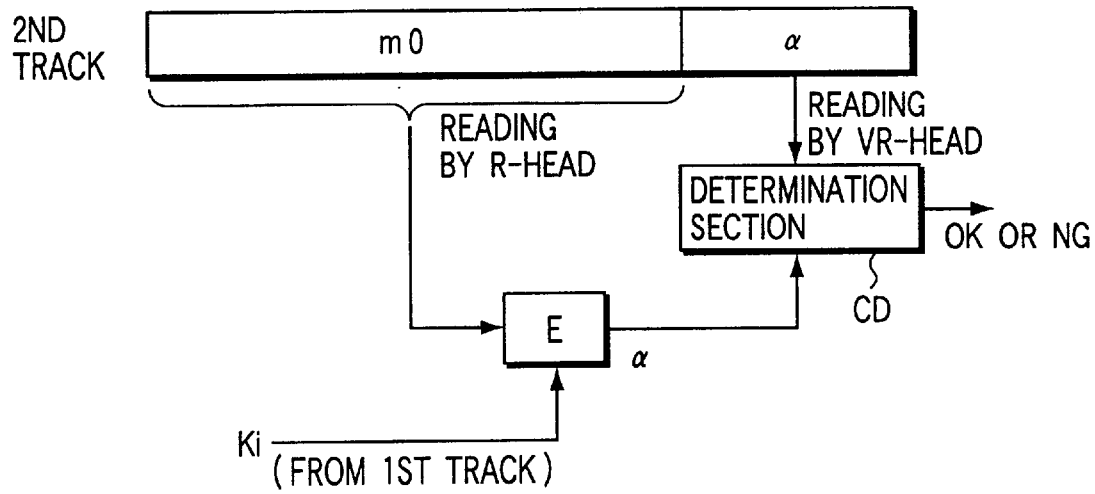
Figure 11G:
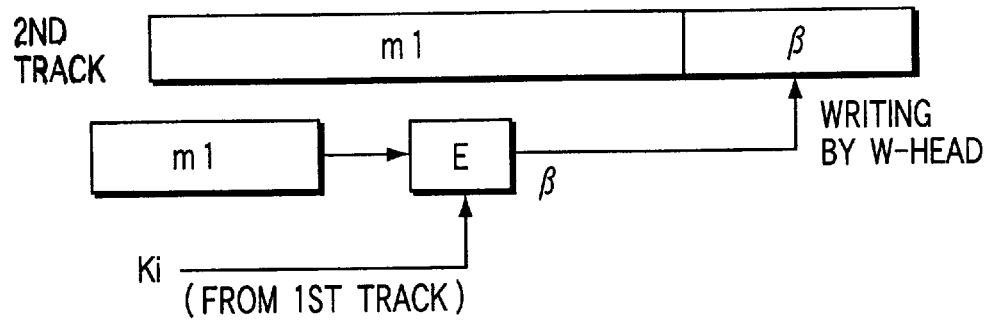

Next, as shown in FIG. 11F, the use record information $m_O$ is encoded to produce the encoded information α on the basis of the key information Ki obtained from the security information from the first track 4. At the same time, the verify magnetic head VR reads out the encoded information α to determine whether to coincide with the encoded information α recorded in the second track 5 of the magnetic card 1 by the issuing machine in advance. The encoded information α in produced by encoding the use record information $m_O$ read out from the second track 5 based on the key information Ki.

That is, the validity of the encoded information α recorded in the second track 5 of the magnetic card 1 is checked in this manner to allow or inhibit a transaction using the magnetic card 1.

When the transaction using the magnetic card 1 is allowed, a predetermined transaction is performed to cause the write magnetic head W to write new use record information $m_1$ in the second track 5 of the magnetic card 1.

As shown in FIG. 11F, the use record information $m_1$ from the second track 5 of the magnetic card 1 is encoded to product encoded information β on the basis of the key information Ki obtained from the security information described above. At the same time, the write magnetic head W records the encoded information β in the second track 5 of the magnetic card 1.

In the next use, the validity of the encoded information β is checked in the same manner as in checking the validity of the encoded information α described above.

In the same manner as described above, the write magnetic head W of the processing machine updates and records new pieces of record information $m_2$, $m_3$, . . . in the second track 5 of the magnetic card 1 for every use. At the same time, pieces of encoded information γ, δ, . . . are sequentially generated on the basis of the key information Ki based on the pieces of use record information $m_2$, $m_3$, . . . and security information obtained from the first track 4 of the magnetic card and are updated and recorded in the second track 5 of the magnetic card 1.

In this embodiment, the duplex azimuth reproducing magnetic head R having a dual magnetic head structure is used. However, as indicated in the parentheses in FIG. 11B, it is also possible to use a first reproducing magnetic head R1 capable of reading issue information of the magnetic card recorded at a predetermined azimuth angle and a second reproducing magnetic head R2 capable of reading security information of the magnetic card recorded at a predetermined azimuth angle different from the former predetermined azimuth angle.

Accordingly, it is possible to provide a card processing apparatus (reader/writer) serving as a card issuing machine and a card processing apparatus serving as a card processing machine for processing a card issued by the card issuing machine, the card issuing machine performing multiplexed information recording using the differences in azimuth angles as the composite condition such that local hard magnetization processing (data erase processing) is performed for a track using a hard magnetization feature by processing for terminating the magnetic reaction of the M magnetic material, i.e., using the fact that information once recorded does not change, and unique data is recorded in the remaining portion of the track, or data is recorded at an azimuth angle of X° in a direction not perpendicular to the conveyance direction of the card.

The third embodiment eliminates the drawback of the conventional magnetic cards that these cards can be forged and altered, and can provide a magnetic card processing apparatus capable of preventing forgery and alteration of a magnetic card.

Fourth Embodiment

In the present invention, it is also possible to use a method of performing the above local hard magnetization process, enlarging the hard magnetized portion for each use (each use in the apparatus) (e.g., the length in the card conveyance direction is increased for each use) to record use records, and disable reproduction in the processing machine shown in FIG. 11.

To widen the hard magnetized portion for each use, use record (the number of times) data is recorded in the card rewritable area, and this data is communicated and recorded for each use.

The method of processing the hard magnetized portion includes both magnetic erase processing and mechanical destruction such as punching.

Therefore, the fourth embodiment can provide a card processing apparatus (reader/writer) for performing local hard magnetization processing for the track, recording the use record by widening the hard magnetized portion for each use, and disabling use for reproduction.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A card processing apparatus for processing a card having a single magnetic mixture layer, comprising:

means for conveying the card having the single magnetic mixture layer comprising a first magnetic material whose magnetic state reversibly and repeatedly changes upon application of a magnetic field and a second magnetic material whose magnetic state and coercive force change upon application of a magnetic field such that the coercive force increases to be stronger than before the application of the magnetic field, wherein the magnetic state does not change state anymore after the application of the magnetic field even when a magnetic field having similar level as said magnetic field is applied to the card;

first magnetic recording means, arranged on said conveying means, for recording first data by applying a first magnetic field so as to record the first data on a predetermined area of said single magnetic mixture layer at a first azimuth angle in order to change the magnetic states of the first and second magnetic materials of said single magnetic mixture layer;

second magnetic recording means, arranged on said conveying means downstream from said first magnetic recording means along a conveyance direction of said card, for recording second data by applying a second magnetic field so as to record the second data at a second azimuth angle different from the first azimuth angle in order to change the magnetic state of the first magnetic material of the predetermined area which is recorded with said first magnetic recording means;

reading means, arranged on said conveying means downstream from said second magnetic recording means along the conveyance direction of said card, for reading the first data recorded on said card at the first azimuth angle by said first magnetic recording means and the second data recorded on said card at the second azimuth angle by said second magnetic recording means; and means for determining on a basis of the data read by said reading means whether or not the first and second data recorded by said first and second magnetic recording means are valid, wherein said first and second magnetic materials are made of materials such that said first and second magnetic recording means are driven at substantially a same current level to record said first and second data.

2. The apparatus according to claim 1, wherein said second magnetic recording means comprises means for applying a magnetic field at a current value having substantially the same level as that of said first magnetic recording means.

3. The apparatus according to claim 1, wherein the first magnetic material included in the single magnetic mixture layer comprises bariumferrite.

4. The apparatus according to claim 1, wherein the second magnetic material included in the single magnetic mixture layer comprises manganese bismuth.

5. The apparatus according to claim 1, wherein the first and second magnetic materials included in the single magnetic mixture layer comprise bariumferrite and manganese bismuth, respectively.

6. A card processing apparatus for processing a card having a single magnetic mixture layer, comprising:

means for conveying the card having the single magnetic mixture layer containing a first magnetic material whose magnetic state reversibly and repeatedly changes upon application of a magnetic field and a second magnetic material whose magnetic state and coercive force change upon application of a magnetic field such that the coercive force increases to be stronger than before the application of the magnetic field, wherein the magnetic state does not change state anymore after the application of the magnetic field even when a magnetic field having similar level as said magnetic field is applied to the card;

first magnetic recording means, arranged on said conveying means, for applying a first magnetic field to said single magnetic mixture layer at a first azimuth angle in order to change the magnetic states of the first and second magnetic materials at one part of said single magnetic mixture layer;

second magnetic recording means, arranged on said conveying means downstream from said first magnetic recording means along a conveyance direction of said card, for recording first data by applying a second magnetic field, in order to change the magnetic states of the first and second magnetic materials, so as to record the first data at a second azimuth angle in a remaining part excluding said one part of said single magnetic mixture layer of said card receiving the first magnetic field by said first magnetic recording means;

third magnetic recording means, arranged on said conveying means downstream from said second magnetic recording means along the conveyance direction of said card, for recording second data by applying a third magnetic field so as to record the second data on the parts of said single magnetic mixture layer recorded with said first and second magnetic recording means, at a third azimuth angle different from the second azimuth angle in order to change the state of the first magnetic material;

reading means, arranged on said conveying means downstream from said third magnetic recording means along the conveyance direction of said card, for reading the first data recorded on said card by said second magnetic recording means and the second data recorded on said card by the third magnetic recording means; and means for determining on a basis of the data read by said reading means whether or not the first and second data recorded by said second and third magnetic recording means are valid;

wherein said first and second magnetic materials are made of materials such that said second and third magnetic recording means are driven at substantially a same current level to record said first and second data.

7. The apparatus according to claim 6, wherein said second magnetic recording means comprises means for applying a magnetic field to said card in order to record the first data at an angle equal to the first azimuth angle.

8. The apparatus according to claim 6, wherein said second magnetic recording means comprises means for applying a magnetic field to said card in order to record the first data at an angle different from the first azimuth angle.

9. The apparatus according to claim 6, wherein said magnetic recording means comprises means for enlarging a change area of the second magnetic material so as to increase a length of the second magnetic material along the conveyance direction of said convey means.

10. The apparatus according to claim 6, wherein the first magnetic material included in the single magnetic mixture layer comprises bariumferrite.

11. The apparatus according to claim 6, wherein the second magnetic material included in the single magnetic mixture layer comprises manganese bismuth.

12. The apparatus according to claim 6, wherein the first and second magnetic materials included in the single magnetic mixture layer comprise bariumferrite and manganese bismuth, respectively.

13. A card processing apparatus for processing a card having a single magnetic mixture layer, comprising:

conveying means for conveying the card magnetically recorded with information relating to use of said card and having the single magnetic mixture layer comprising a first magnetic material whose magnetic state reversibly and repeatedly changes upon application of a magnetic field and a second magnetic material whose magnetic state and coercive force change upon application of a magnetic field such that the coercive force increases to be stronger than before the application of the magnetic field, wherein the magnetic state does not change state anymore after the application of the magnetic field even when a magnetic field having similar level as said magnetic field is applied to the card;

reading means, arranged on said conveying means, for reading the information relating to use of said card from a predetermined area of said card; and magnetic recording means for applying a magnetic field to said card in order to enlarge a change area of the second magnetic material of said single magnetic mixture layer, which differs from the predetermined area of the card, on a basis of the information read by said reading means, wherein said first and second magnetic materials are made of materials such that said magnetic recording means is driven at substantially a same current level to record first and second data.

14. The apparatus according to claim 13, wherein the first magnetic material included in the single magnetic mixture layer comprises bariumferrite.

15. The apparatus according to claim 13, wherein the second magnetic material included in the single magnetic mixture layer comprises manganese bismuth.

16. The apparatus according to claim 13, wherein the first and second magnetic materials included in the single magnetic mixture layer comprise bariumferrite and manganese bismuth, respectively.

17. A card processing method of processing a card having a single magnetic mixture layer, comprising:

conveying the card having the single magnetic mixture layer comprising a first magnetic material whose magnetic state reversibly and repeatedly changes upon application of a magnetic field and a second magnetic material whose magnetic state and coercive force change upon application of a magnetic field such that the coercive force increases to be stronger than before the application of the magnetic field, wherein the magnetic state does not change state anymore after the application of the magnetic field even when a magnetic field having similar level as said magnetic field is applied to the card;

recording first data by applying a first magnetic field so as to record the first data on said single magnetic mixture layer of said card at a first azimuth angle in order to change the states of the first and second magnetic materials of said single magnetic mixture layer;

recording second data by applying a second magnetic field so as to record the second data at a second azimuth angle different from the first azimuth angle in order to change the magnetic state of the first magnetic material of a predetermined area on which the first data is recorded; and reading the first data recorded on said card at the first azimuth angle and the second data recorded on said card at the second azimuth angle;

wherein said first and second magnetic materials are made of materials such that said first and second magnetic recording steps are driven at substantially a same current level to record said first and second data.

18. The method according to claim 8, wherein the first magnetic material included in the single magnetic mixture layer comprises bariumferrite.

19. The method according to claim 17, wherein the second magnetic material included in the single magnetic mixture layer comprises manganese bismuth.

20. The method according to claim 17, wherein the first and second magnetic materials included in the single magnetic mixture layer comprise bariumferrite and manganese bismuth, respectively.

* * * * *